United States Patent [19]

Castellano

[11] Patent Number: 4,682,188

[45] Date of Patent: Jul. 21, 1987

[54] SERIAL INK JET PRINTING ARRANGEMENT PROVIDING A REMOVABLY MOUNTING OF THE PRINTING HEAD ON A CARRIAGE

[75] Inventor: Pietro Castellano, Castellamonte, Italy

[73] Assignee: Ing. C. Olivetti & C., S.p.A., Ivrea, Italy

[21] Appl. No.: 774,369

[22] Filed: Sep. 10, 1985

[30] Foreign Application Priority Data

Sep. 10, 1984 [IT] Italy .............................. 67890 A/84

[51] Int. Cl.[4] ............................................ G01D 15/16

[52] U.S. Cl. ............................. 346/140 R; 346/139 C

[58] Field of Search ............. 346/140 PD, 75, 76 PH, 346/139 C, 140 R

[56] References Cited

U.S. PATENT DOCUMENTS 4,030,588 6/1977 Hanagata ....................... 346/76 PH
4,503,442 3/1985 Barbero ........................ 346/140 PD
4,530,611 7/1985 Borcenk ....................... 346/140 PD
4,555,715 11/1985 Vegeais .......................... 346/76 PH

*Primary Examiner*—Clifford C. Shaw
*Assistant Examiner*—Mark Reinhart
*Attorney, Agent, or Firm*—Banner, Birch, McKie & Beckett

[57] ABSTRACT

A head (13) comprises a closed container (15) carrying internal (139) and external electrodes and a nozzle (18) and is mounted removably on a carriage (14) on which it is held by a permanent magnet (43) in such a way that the head bears with the external electrode against a metal sheet (32). The magnet is of an annular shape and is carried by the carriage. It attracts a metal plate (39) in the bottom of the container, which carries a pin (41) for centering the head on the carriage and is utilized to make connection to the internal electrode (139). A protuberance adjacent the nozzle (18) presses against the metal sheet (32) which in turn presses the paper (11) against a platen (10). The protuberance establishes the jet-to-paper spacing.

4 Claims, 5 Drawing Figures

SERIAL INK JET PRINTING ARRANGEMENT PROVIDING A REMOVABLY MOUNTING OF THE PRINTING HEAD ON A CARRIAGE

BACKGROUND OF THE INVENTION

The invention relates to a serial ink jet printing arrangement comprising a head with a nozzle carrier for an ink emission nozzle, the head being provided with a projection and mounted removably on a carriage which is movable transversely with respect to the print carrier.

In a known arrangement of the above-indicated type, with liquid, electrically conductive ink, the head is mounted on the carriage by catch means while the carriage is urged resiliently in such a direction as to bear against the print carrier, whereby the nozzle is held at a predetermined distance from the carrier. Such heads are generally expensive to build and suffer from a deterioration in the resilent characteristics of the resilient connection of the carriage.

SUMMARY OF THE INVENTION

The object of the present invention is to provide a printing head which can be connected to a carriage in a simple manner without using catch or spring means.

According to the invention, the printing head is characterized in that the carriage and head are provided with magnet means for holding the head with the projection bearing against the print carrier, whereby the nozzle is held at a constant spacing from the print carrier.

BRIEF DESCRIPTION OF THE DRAWINGS

The invention will be described in more detail, by way of example, and with reference to the accompanying drawings, in which.

DESCRIPTION OF THE PREFERRED EMBODIMENTS

Figure 1:
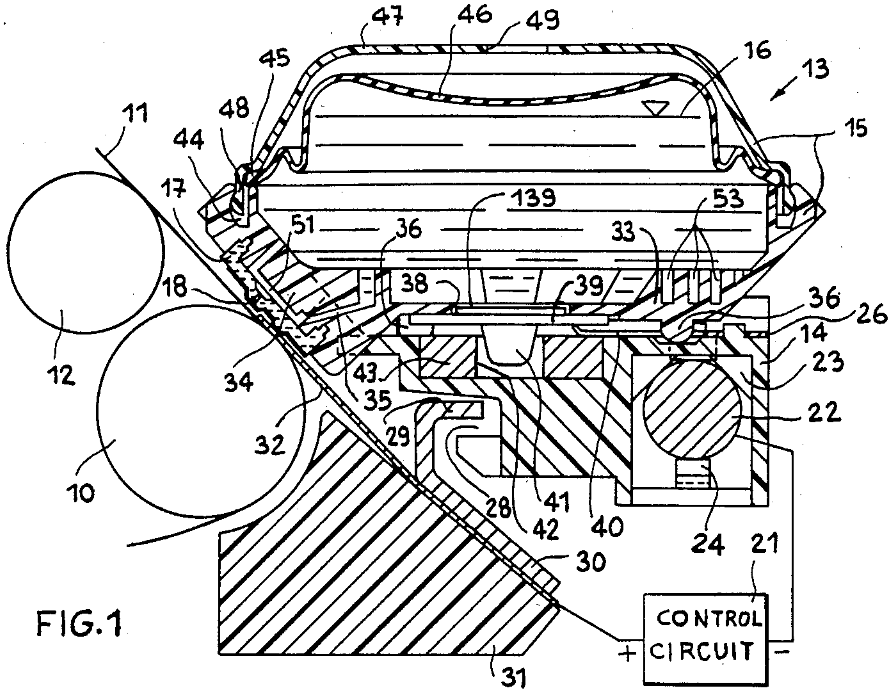
FIG. 1 is a view in longitudinal section of a serial printing arrangement embodying the invention.

Referring to FIG. 1, reference numeral 10 generally indicates a platten roller for a sheet of paper 11 which bears against another roller 12 and which is displaced vertically to permit the printing of dots in successive elementary rows, for example for dot matrix alphabetic printing.

The printer comprises an ink jet printing head which is generally indicated by reference numeral 13 and which is mounted on a carriage 14 that is movable transversely with an alternating movement, in per se known fashion.

The head 13 essentially comprises a container 15 of insulating material for the ink 16 which is electrically conducting. The container 15 is closed towards the platten roller 10 by a plate 17 of alumina in which there is provided a nozzle 18 for expelling particles of ink 16.

Figure 3:
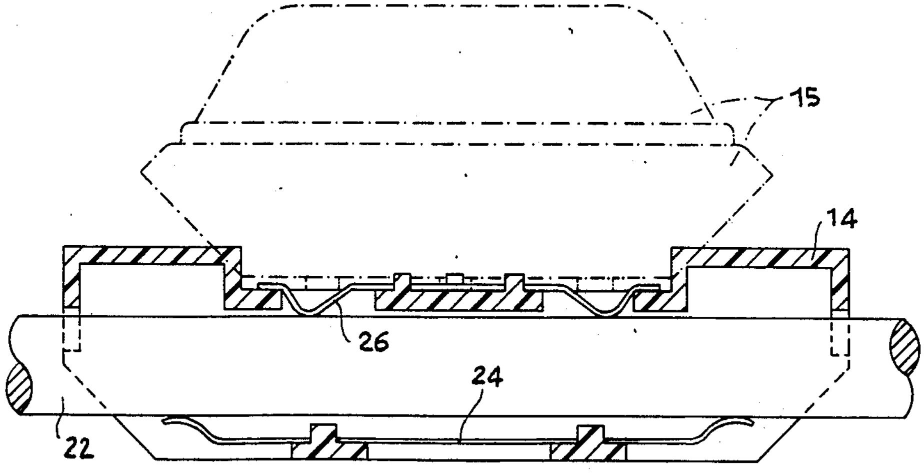
FIG. 3 is a view of part of the arrangement shown in FIG. 2 in section taken along line III—III therein.

The carriage 14 is guided transversely by a cylindrical metal bar 22 against which it bears with a V-shaped seat 23, by means of a leaf spring 24 for eliminating play (see also FIG. 3). The carriage 14 also carries an electrical contact 26 which slides along the bar 22 and which is electrically connected to the negative terminal of a control circuit 21 (see FIG. 1).

The carriage 14 is also provided with a seat 28 which, with a great deal of play, engages a horizontal flange 29 on a shaped transverse bar 30. Fixed between the bar 30 and a prismatic bar 31 is a transverse elastic sheet 32 of electrically conductive material which is electrically connected to the positive terminal of the circuit 21. The bars 30 and 31 are fixed in position in such a way as to hold the sheet 32 in a position in which it bears under a certain loading and thus with a certain degree of flexing against the platen roller 10 substantially in the plane which is tangential both with repect to the roller 10 and the roller 12, wherby it acts as a paper pressing means.

Figure 2:
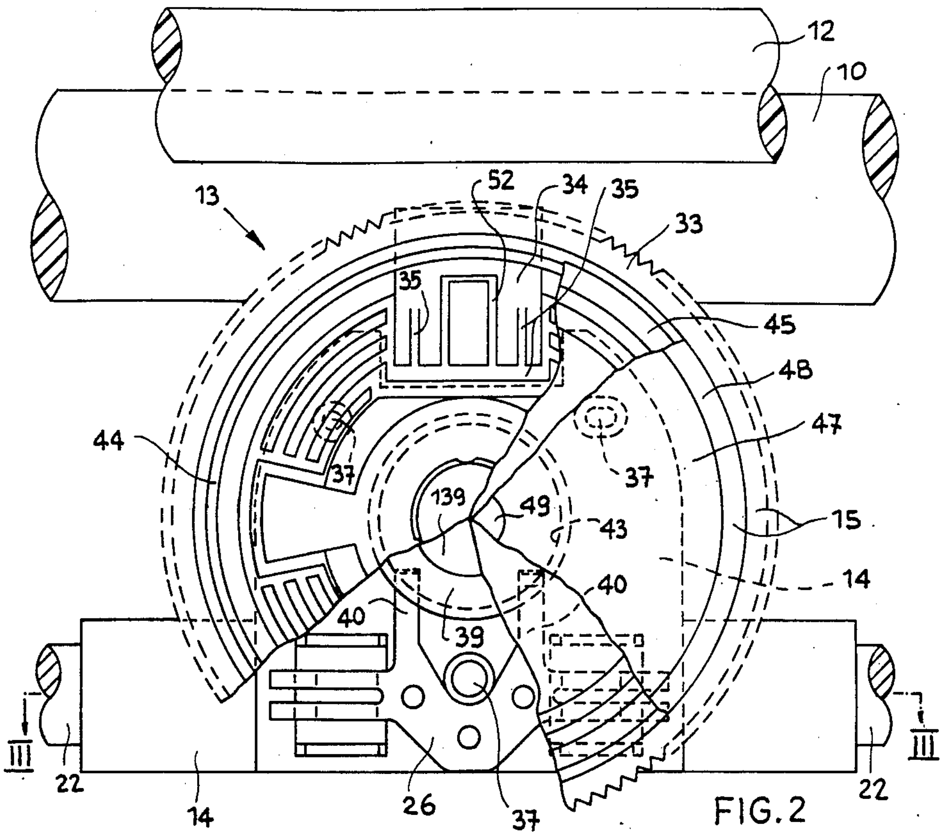
FIG. 2 is a partly sectional plan view of the head shown in FIG. 1.

The container 15 (see FIG. 2) is formed by a lower shell 33 of ABS, of substantially circular shape, with the outside edge knurled. It comprises a front portion 34 (see FIG. 1) which is inclined at 45° in a downward direction and is provided with the ducts 35 for conduction of ink to the nozzle 18. In its lower part, the shell 33 is provided with three positioning projections 36 which are arranged to engage three corresponding reference depressions 37 (see FIG. 2) in the carriage 14.

Provided the central part of the shell (see FIG. 1) is a hole 38 in which a ferromagnetic disc 39 is bonded. The disc 39 is also electrically conductive and is engaged by two cantilever portions 40 (see FIG. 2) of the sliding contact 26.

The disc 39 is connected to a plate 139 which forms the electrode of the printing head, which is in contact with the ink 16. The disc 39 (FIG. 1) integrally carries a slightly conical pin or peg 41 which is capable of engaging a hole 42 in a permanent magnet 43 of annular shape, which is fixed on the carriage 14. The magnet 43 permits the head 13 to be removably mounted on the carriage 14. By virtue of the peg 41 and the portions 36, the container 15 is self-centering on the carriage 14. In addition, the magnet connection is elastic and, as will be seen in greater detail hereinafter, permits the head 13 to be positioned at a fixed spacing from the paper, independently of the thickness of or irregularity in the paper 11.

The shell 33 is delimited in its upper part by a U-shaped seat 44, on the inward edge of which is supported an edge 45 of a flexible diaphragm 46, for example of silicone rubber. The container 15 further comprises a cover 47 with a beaded edge 48 which is capable of engaging with snap action in the seat 44. The edge 45 is locked on the shell 33 by the edge 48 of the cover 47 whereby the ink is hermetically enclosed between the shell 33 and the diaphragm 46. The cover 47 is provided with a central hole 49 which, by way of the diaphragm 46, permits the ink 16 in the container 15 always to be maintained at atmospheric pressure.

Ink 16 can be introduced into the container 15 over and over again, after the diaphragm 46 has been locked between the shell 33 and the cover 47, by piercing the diaphragm 46 with a syringe through the hole 49. Firstly, the air is extracted from the container, and the desired amount of ink is injected. The silicone rubber of the diaphragm 46 has resilient characteristics such that, when the needle of the syringe is withdrawn from the diaphragm 46, the hole closes up again automatically.

The portion 34 if the container 15 comprises a wall 50 which is parallel to the plate 17, to define a space 51 whose thickness is substantially equal to that of the plate 17. The space 51 communicates with the interior of the container by way of a section 52 of the wall 50. The shell 33 (see FIG. 2) is provided with a series of ribs 53 which forms ducts for conveying the ink towards the ducts 35 and the base of the section 52 wherby the nozzle 18 is supplied with ink down to the last drop thereof.

The plate 17 is of rectangular shape and has a rib 54 (see FIG. 4) for forming to a complementary groove on the outside surface of the front portion 34 (see FIG. 1 ). The thickness of the plate 17 is between 0.3 and 0.6 mm and the plate 17 has a projection 55 (see FIGS. 4 and 5) which extends over the entire width of the plate 17 and which serves to define the spacing of the nozzle 18 from the paper.

Two other projections 60 (see FIG. 5) disposed at the two sides of the nozzle 18 contribute to holding the paper taut in the printing position.

In association with the nozzle 18, the plate 17 also has a circular protuberence 56 (see FIG. 4), whose diameter is about 0.5 mm and which projects substantially from the thickness of the plate 17 itself. The proturberence 56 thus forms, at its rear, a frustoconical depression 57. A metal layer 58 of a thickness of 40 to 100μ is provided on the outside surface of the plate 17, in a region which embraces both the projection 55 (see FIG. 5) and the protuberance 56.

Figure 4:
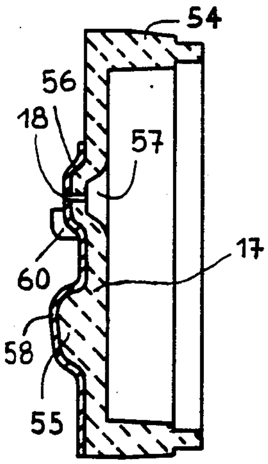
FIG. 4 is a view in section on an enlarged scale of a detail from FIG. 1.
Figure 5:
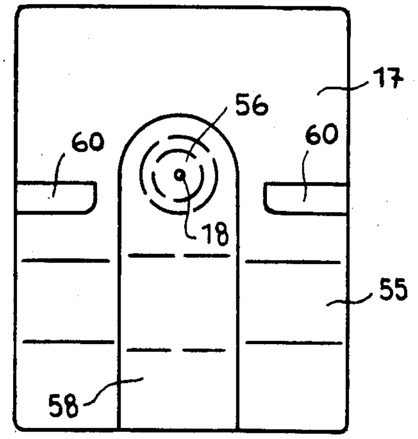
FIG. 5 is a front view of the FIG. 4 detail.

The plate 17 with the metal layer 58 (FIG. 4 is then bored with a laser beam so as to produce a nozzle 18 whose diameter is between 30 and 50μ, the nozzle passing centrally through the portuberance 56.

The magnet 43 normally holds the printing head 13 with the three protuberances 36 supported in the seats 37. The plate 17 is held in contact with the sheet 32 at the position of the projection 55 (FIG. 5) while the carriage 14 adjusts its positon to the thickness of the paper by virtue of the clearance between the seat 28 and the bar 29. The metal layer 58 forms a second electrode which is disposed on the outside surface of the plate 17 adjacent to the nozzle 18.

The dot printing process is carried out by selectively causing the pilot control circuit 21 to pass a voltage pulse between the electrode 58 and the electrode 39. A state of electrical and thermal excitation is then produced at the meniscus that the ink 16 forms in the nozzle 18, such as to cause a droplet of ink to be expelled through the nozzle 18, substantially in the manner described in our published European patent application EP No. 0 129 330.

In order to reduce the formation of gas towards the interior of the container 15, the nozzle 18 may be internally shaped in such a way as to have a variable profile along its axis, such as to create a region of maximum diameter within the nozzle 18. That region forms an ink plenum which easily absorbs the pressure wave and facilitates rapid restoration of the ink meniscus in the vicintity of the outlet of the nozzle 18. That region may be produced by covering the metal layer of the electrode 58 with a second metal layer which is deposited by electrolytic growth. At the edge of the electrode, on the nozzle 18, the above-indicated second metal layer produces a constriction or throttling effect, causing the nozzle 18 to assume a varying profile.

Alternatively, the hole of the nozzle 18 which is produced by the laser may then be enlarged to create the variable profile required for the nozzle 18.

It will be appreciated that the printing head as described hereinbefore may be the subject of various other modifications and improvements without departing from the scope of the invention. For example, the peg 41 (FIG. 1) may have a spherical head capable of engaging spring arms.

I claim:

1. An ink jet printing arrangement for printing lines of information on a print support carrier, comprising a single cylindrical guide member parallel to said lines, a carriage mounted on said guide member for being transversely moved with respect to said support carrier, a printing head mounted on said carriage, said printing head including a plate carrying at least one nozzle for the emmission of ink droplets and a linear projection parallel to said lines and adapted to contact said support carrier to hold said nozzle at a constant spacing from said support carrier, wherein the improvement includes:

an annular permanent magnet secured to said carriage, and a ferromagnetic disk secured to said head and provided with a substantially frustoconical projection for centering said annular magnet, said annular magnet cooperating with said disk to hold said printing head removably in contact with said carriage and said linear projection in contact with said support carrier, whereby the angular position of said carriage on said guide member is automatically adjusted.

2. An ink jet arrangement for printing lines of information on a print support carrier, comprising a single cylindrical guide member parallel to said lines, a carriage mounted on said guide member for being transversely movable with respect to said support carrier, a printing head mounted on said carriage, said head including a container made of insulating material for containing an electrically conductive liquid ink, said container being closed by an insulating plate carrying at least one nozzle for the emission of ink droplets, a pulse generator for selectively applying voltage pulses between a first electrode in contact with the ink and a second electrode formed of a metallic layer located on the outside surface of said plate around said nozzle for causing said emission of ink droplets, said plate being provided with a linear projection parallel to said lines and adapted to contact said support carrier to hold said nozzle at a constant spacing from said support carrier, wherein the improvement includes:

an annular permanent magnet located on an upper surface of said carriage, a circular aperture on a lower portion of said container, and a ferromagnetic disk secured to said lower portion of the container in such a position as to close said aperture, said disk having a portion forming said first electrode in contact with the ink and a substantially frustoconical projection for centering said annular magnet, said annular magnet cooperating with said disk to hold said head removably on said carriage with the lower portion of said container in contact with said carriage and said linear projection in contact with said support carrier, whereby the angular position of said carriage on said guide member is automatically adjusted.

3. A printing arrangement according to claim 2, wherein said carriage mounts a first metal sheet, electrically connected to said pulse generator and having at least a resilient cantilever position in contact with said disc, the metallic layer forming said second electrode extending over said linear projection, which bears against a free edge of a second metal sheet having a rectangular shape and extended parallel to said support carrier, said second metal sheet being resilient and having an edge opposite to said free edge secured to said carriage, the action of said annular magnet on said disk being so commensurate as to cause said linear projection to flex said second metal sheet and to bear against support carrier, means being provided for electrically connecting said pulse generator to said second metal sheet.

4. A printing arrangement according to claim 8, wherein said container comprises a lower shell carrying said plate and provided with said aperture, said lower shell being upwards closed by a flexible diagram, said container also comprising a cover having an edge adapted to seal the edge of said diaphragm to the free edge of said lower shell by snap action, said cover being provided with an opening for the diaphragm for causing the diaphragm to keep the ink at atmospheric pressure.

* * * * *